(12) United States Patent
Ritter et al.

(10) Patent No.: US 10,107,260 B2
(45) Date of Patent: Oct. 23, 2018

(54) WIND TURBINE AUXILIARY CIRCUIT CONTROL

(71) Applicant: General Electric Company, Schenectady, NY (US)

(72) Inventors: Allen Michael Ritter, Roanoke, VA (US); Harold Robert Schnetzka, Simpsonville, SC (US); Sidney Allen Barker, Troutville, VA (US); Edward Wayne Hardwicke, Jr., Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 441 days.

(21) Appl. No.: 14/945,541

(22) Filed: Nov. 19, 2015

(65) Prior Publication Data

US 2017/0145989 A1 May 25, 2017

(51) Int. Cl.
*H02H 3/00* (2006.01)
*F03D 7/02* (2006.01)
*F03D 7/04* (2006.01)
*F03D 17/00* (2016.01)

(52) U.S. Cl.
CPC ......... *F03D 7/0288* (2013.01); *F03D 7/0284* (2013.01); *F03D 7/042* (2013.01); *F03D 17/00* (2016.05); *Y02E 10/723* (2013.01)

(58) Field of Classification Search
USPC .......................................................... 361/86
See application file for complete search history.

(56) References Cited

U.S. PATENT DOCUMENTS

| | | | | |
|---|---|---|---|---|
| 7,016,793 B2* | 3/2006 | Ye | ...................... | G01R 19/2513 290/40 B |
| 8,669,669 B1* | 3/2014 | Wagoner | ................. | H02P 9/007 290/44 |
| 9,347,434 B2* | 5/2016 | Gupta | ................... | F03D 7/0264 |
| 9,496,813 B2* | 11/2016 | Gupta | ................... | F03D 7/0224 |
| 9,871,407 B2* | 1/2018 | Nielsen | ................... | H02J 9/061 |
| 2003/0080741 A1* | 5/2003 | LeRow | ..................... | H02J 3/38 324/320 |
| 2008/0157529 A1* | 7/2008 | Rivas | ..................... | H02P 9/007 290/44 |
| 2011/0193345 A1* | 8/2011 | Arinaga | ................ | F03D 7/0224 290/44 |
| 2013/0234520 A1* | 9/2013 | Dierksheide | ............ | H02J 3/382 307/65 |
| 2015/0364949 A1* | 12/2015 | Nielsen | ................... | F03D 7/026 307/23 |

* cited by examiner

*Primary Examiner* — Ronald W Leja
(74) *Attorney, Agent, or Firm* — Dority & Manning, P.A.

(57) ABSTRACT

Systems and methods for controlling operation of one or more auxiliary circuits in a wind turbine system are provided. For instance, a grid event associated with the wind turbine system can be detected. In response to the grid event, a control signal can be provided to an auxiliary circuit breaker of the wind turbine system. The auxiliary circuit breaker can be associated with one or more auxiliary circuits that are not directly in a power production path of the wind turbine system. The auxiliary circuit breaker can disconnect the one or more auxiliary circuits from the grid based at least in part on the control signal.

20 Claims, 5 Drawing Sheets

WIND TURBINE AUXILIARY CIRCUIT CONTROL

FIELD OF THE INVENTION

The present subject matter relates generally to wind turbines and more particularly to systems and methods for controlling operation of auxiliary loads of a wind turbine system.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Grid conditions associated with the utility grid may fluctuate. For instance, such grid conditions may cause a grid event associated with a wind turbine, such as a high voltage event, a low voltage event, a frequency shifting event, a phase shifting event, an islanding event, or various other grid events. Such grid events may damage one or more components of the wind turbine if protective action is not taken. For instance, a grid event may damage one or more motors, circuits, control devices, etc. associated with the wind turbine.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a control method of controlling operation of one or more auxiliary circuits in a wind turbine system. The method includes detecting a grid event associated with a wind turbine system. The method further includes, in response to detecting the grid event, providing a control signal to an auxiliary circuit breaker. The auxiliary circuit breaker is associated with one or more auxiliary circuits that are not directly in a power production path of the wind turbine system. The method further includes disconnecting, by the auxiliary circuit breaker, the one or more auxiliary circuits from the grid based at least in part on the control signal.

Another example aspect of the present disclosure is directed to a control system associated with a wind turbine system. The control system is configured to control operation of an auxiliary system associated with the wind turbine system by detecting a grid event associated with an electrical grid associated with the wind turbine system, and, in response to detecting the grid event, providing a control signal to an auxiliary circuit breaker associated with the auxiliary system. The auxiliary circuit breaker is configured to selectively couple the auxiliary system to the wind turbine system. The control signal causes the circuit breaker to disconnect the auxiliary system from the wind turbine system independently from an amount of load current flowing between the auxiliary circuit breaker main contacts.

Yet another example aspect of the present disclosure is directed to a wind turbine system including a rotor, a stator, one or more auxiliary loads for supporting operation of the wind turbine system, a power converter system configured to monitor a voltage associated with an electrical grid, and a control device. The control device is configured to control operation of an auxiliary circuit breaker configured to selectively couple the one or more auxiliary loads to the wind turbine system by detecting a grid event associated with the electrical grid, and, in response to detecting the grid event, providing a control signal to the auxiliary circuit breaker. The control signal is provided via a shunt trip device coupled to the auxiliary circuit breaker. The control signal causes the auxiliary circuit breaker to disconnect the one or more auxiliary loads.

Variations and modifications can be made to these example embodiments of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
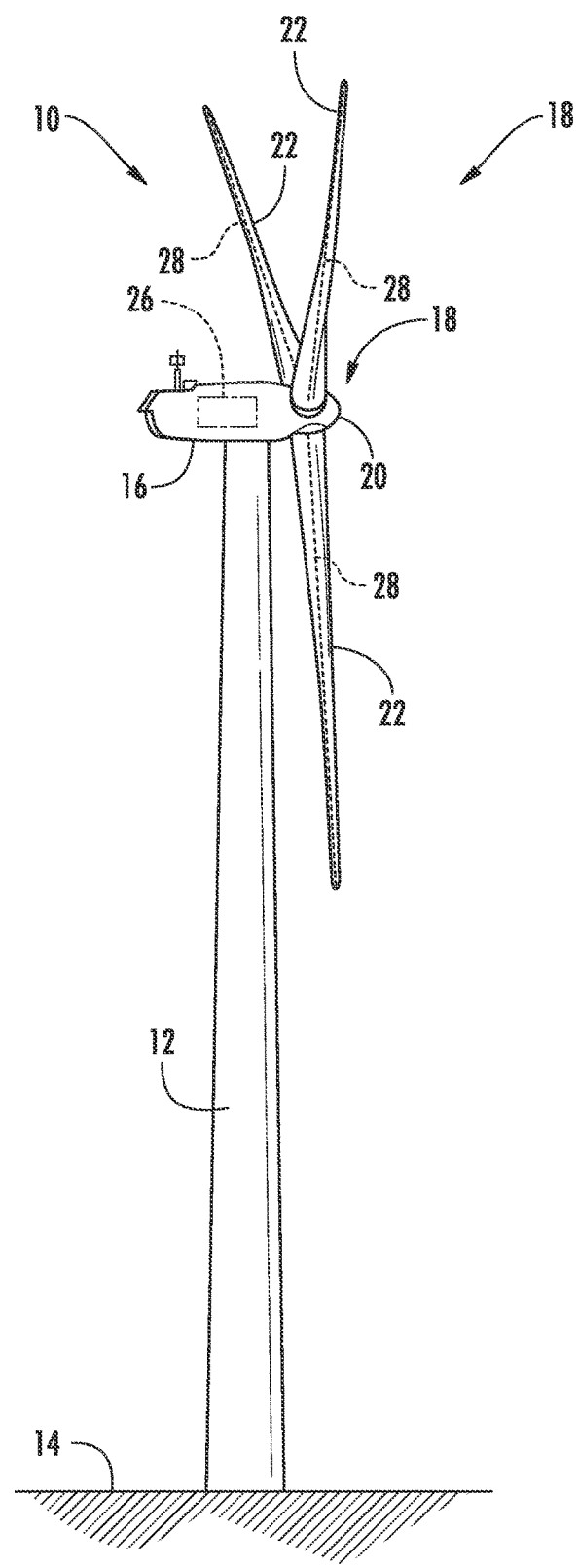
FIG. 1 depicts a perspective view of one embodiment of a wind turbine according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to controlling one or more auxiliary circuits in a power system. For instance, a grid event can be detected based at least in part on a monitored voltage associated with an electrical grid. In response to detecting the grid event, a control signal can be sent from a power converter associated with the power system to an auxiliary circuit breaker configured to couple one or more auxiliary components and/or circuit configurations to the electrical grid. In response to detecting the control signal, the auxiliary circuit breaker can disconnect at least one of the auxiliary components from the electrical grid.

More particularly, one or more grid events can be detected, for instance, by monitoring a grid voltage and/or a grid current over one or more time periods. For instance, in some embodiments, a grid event can be detected by determining a grid impedance based at least in part on the monitored grid voltage and/or grid current. Such grid events may cause high voltage events, low voltage events, zero voltage events, frequency shifts, phase shifts, and/or various other events that may detrimentally affect the power system if protective actions are not taken. In response to detecting a grid event, a control signal may be provided to an auxiliary circuit breaker associated with the power system. The auxiliary circuit breaker may be configured to selectively couple one or more auxiliary loads to the electrical grid. The one or more auxiliary loads may include one or more auxiliary circuits for supporting operation of the power system. For instance, in embodiments wherein the power system is a wind turbine system, such auxiliary loads may include one or more auxiliary circuits relating to yaw drives, pumps, temperature regulators, pitch control motors, lighting systems, diagnostic equipment, and/or various other suitable components or systems. In particular, an auxiliary circuit may be any circuit in the wind turbine system not directly in the power production path.

The control signal may cause the auxiliary circuit breaker to trip, thereby disconnecting at least one of the one or more auxiliary loads from the grid. In particular, the control signal may be provided to the auxiliary circuit breaker via a shunt trip device that causes the auxiliary circuit breaker to trip. The shunt trip device may be an external, separate component from the auxiliary circuit breaker, or may be integrated within the auxiliary circuit breaker. In this manner, the shunt trip device may provide the control signal to the auxiliary circuit breaker causing the auxiliary circuit breaker to trip. In particular, the control signal may cause the auxiliary circuit breaker to trip independently from an amount of current flowing through the main contacts of the auxiliary circuit breaker.

In example embodiments, when a grid event is detected, the grid voltage may be compared to a threshold. If the grid voltage does not exceed the threshold, the power converter associated with the power system can adjust an amount of reactive power associated with the power system to compensate for the grid event. For instance, the power converter can increase or decrease an amount of volt-amperes reactive (vars) based at least in part on the grid event. If the grid voltage exceeds the threshold, the control signal can be sent to the auxiliary circuit breaker causing the auxiliary circuit breaker to trip. In some implementations, the power converter and a stator sync switch associated with the power converter can also be disconnected from the grid when the grid voltage exceeds the threshold. In a particular implementation, the voltage threshold can be implemented as a voltage range or window. In such implementation, if the grid voltage falls within the voltage range, the power converter can be configured to adjust the reactive power. If the grid voltage falls outside of the voltage range, the control signal can be provided to the auxiliary circuit breaker.

Subsequent to disconnecting the auxiliary loads and/or the power converter from the grid, the grid voltage and/or grid current can continue to be monitored. In this manner, when grid conditions are such that operation of the auxiliary loads and/or the power converter will not cause damage to the auxiliary loads and/or power converter, the auxiliary loads and/or power converter may be reconnected to the electrical grid.

With reference now to the figures, example embodiments of the present disclosure will be discussed in further detail. For instance, FIG. 1 depicts a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator positioned within the nacelle 16 to permit electrical energy to be produced.

The wind turbine 10 may also include a turbine control system including turbine controller 26 within the nacelle 16 and/or in various other locations associated with the wind turbine 10. In general, the turbine controller 26 may comprise one or more processing devices. Thus, in several embodiments, the turbine controller 26 may include suitable computer-readable instructions that, when executed by one or more processing devices, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10.

Figure 2:
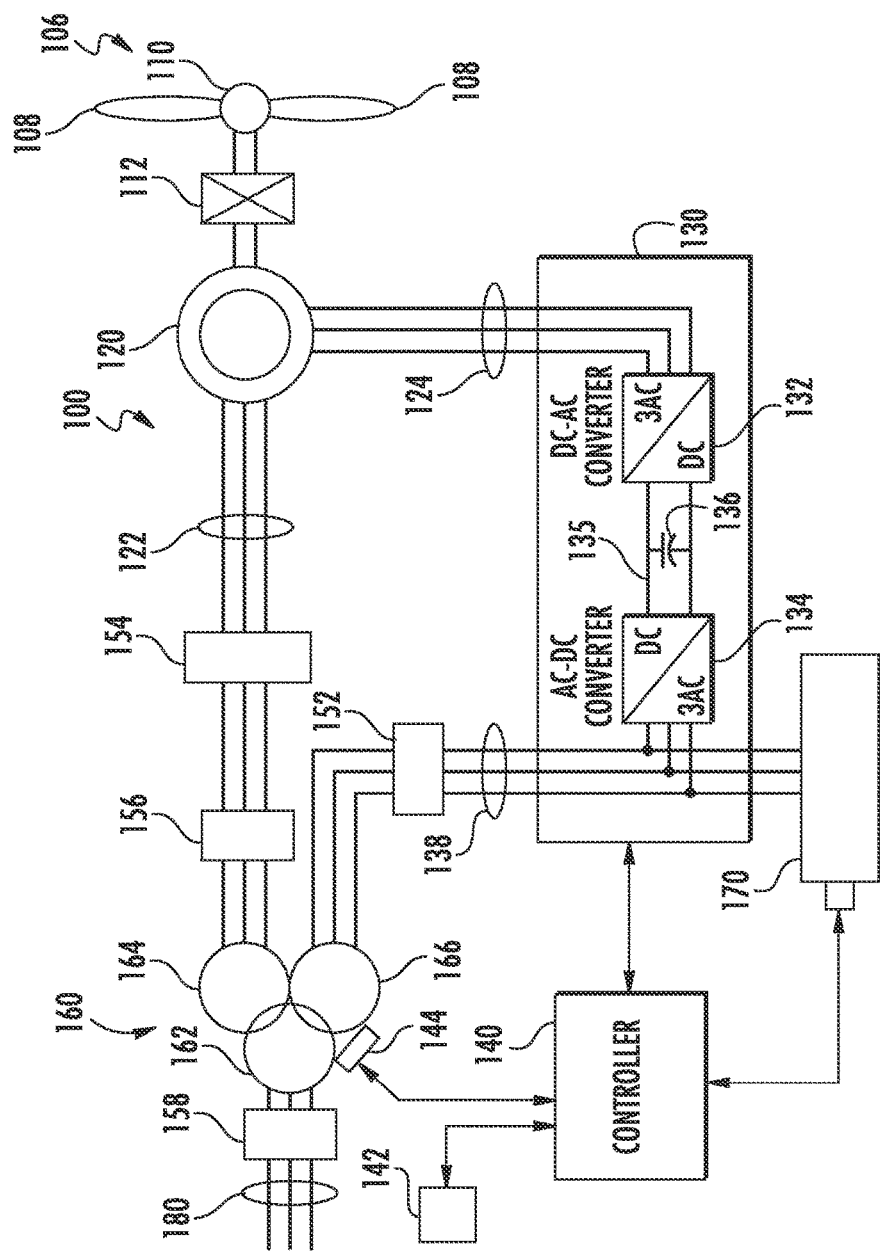
FIG. 2 depicts an overview of a wind turbine system according to example embodiments of the present disclosure.

FIG. 2 depicts an example doubly-fed induction generator (DFIG) wind turbine system 100 according to example embodiments of the present disclosure. For instance, wind turbine system 100 can correspond to wind turbine 10 of FIG. 1 or other wind turbine system. In the example system 100, a rotor 106 includes a plurality of rotor blades 108 coupled to a rotating hub 110, and together define a propeller. The propeller is coupled to an optional gear box 112, which is, in turn, coupled to a generator 120. In accordance with aspects of the present disclosure, the generator 120 is a doubly fed induction generator (DFIG) 120.

DFIG 120 is typically coupled to a stator bus 122 and a power converter 130 via a rotor bus 124. The stator bus 122 provides an output multiphase power (e.g. three-phase power) from a stator of DFIG 120 and the rotor bus 124 provides an output multiphase power (e.g. three-phase power) of the rotor of DFIG 120. Referring to the power converter 130, DFIG 120 is coupled via the rotor bus 124 to a rotor side converter 132. The rotor side converter 132 is coupled to a line side converter 134 which in turn is coupled to a line side bus 138.

In example configurations, the rotor side converter 132 and the line side converter 134 are configured for normal operating mode in a three-phase, pulse width modulation (PWM) arrangement using insulated gate bipolar transistors (IGBTs) as switching devices. Other suitable switching devices can be used, such as insulated gate commuted thyristors, MOSFETs, bipolar transistors, silicon controlled rectifiers, or other suitable switching devices. The rotor side converter 132 and the line side converter 134 can be coupled via a DC link 135 across which is the DC link capacitor 136.

The power converter 130 can be coupled to a converter controller 140 to control the operation of the rotor side converter 132 and the line side converter 134. In example implementations, converter controller 140 may be implemented within power converter 130 or may be coupled to power converter 130. For instance, the controller 140 can send control commands to the rotor side converter 132 and line side converter 134 to control the modulation of switching elements (such as IGBTs) used in the power converter 130 to provide a desired real and reactive power output. The controller 140 can be any suitable control circuit. For instance, in one aspect the controller can include summers, compensating regulators, and other devices used to process signals received at the controller 140. In another embodiment, the controller 140 can include a processing device (e.g. microprocessor, microcontroller, etc.) executing computer-readable instructions stored in a computer-readable medium. The instructions when executed by the processing device can cause the processing device to perform control operations, such as regulating voltage of the DFIG wind turbine system 100 according to any exemplary aspects of the present disclosure.

As illustrated, the system 100 includes a transformer 160 coupling the wind turbine system 100 to an electrical grid 180. The transformer 160 of FIG. 2 is a three-winding transformer that includes a high voltage (e.g. greater than 12 KVAC) primary winding 162 coupled to the electrical grid, a medium voltage (e.g. 6 KVAC) secondary winding 164 coupled to the stator bus 122, and a low voltage (e.g. 575 VAC, 690 VAC, etc.) auxiliary winding 166 coupled to the line bus 138. However, it will be appreciated that various other transformer configurations (e.g. a two-winding transformer) may be used without deviating from the scope of the present disclosure.

An auxiliary system 170 is coupled to the line bus 138 of the power converter 130. The auxiliary system 170 can include various auxiliary components of the wind turbine system 100. For instance, the auxiliary system 170 can include fans, pumps, motors, lights, yaw drives, and/or other suitable components of the wind turbine system 100. Auxiliary system 170 can further have an associated auxiliary power feed configured to provide power to the various auxiliary components. As will be described with regard to FIG. 4, auxiliary system 170 can further include an auxiliary circuit breaker (such as auxiliary circuit breaker 64 depicted in FIG. 4) configured to connect or disconnect an auxiliary bus.

In operation, power generated at DFIG 120 by rotating the rotor 106 is provided via a dual path to electrical grid 180. The dual paths are defined by the stator bus 122 and the rotor bus 124. On the rotor bus side 124, sinusoidal multi-phase (e.g. three-phase) alternating current (AC) power is provided to the power converter 130. The rotor side power converter 132 converts the AC power provided from the rotor bus 124 into direct current (DC) power and provides the DC power to the DC link 135. Switching devices (e.g. IGBTs) used in parallel bridge circuits of the rotor side power converter 132 can be modulated to convert the AC power provided from the rotor bus 124 into DC power suitable for the DC link 135.

The line side converter 134 converts the DC power on the DC link 135 into AC power at a frequency suitable for the electrical grid 180. In particular, switching devices (e.g. IGBTs) used in bridge circuits of the line side power converter 134 can be modulated to convert the DC power on the DC link 135 into AC power on the line side bus 138. The power from the power converter 130 can be provided via the auxiliary winding 166 of the transformer 160 to the electrical grid 180.

Various circuit breakers, fuses, switches, contactors, and other devices, such as grid breaker 158, stator bus breaker 156, stator sync switch 154, line bus breaker 152, and the auxiliary circuit breaker 64 can be included in the system 100 to connect or disconnect corresponding buses, for example, when current flow is excessive and can damage components of the wind turbine system 100 or for other operational considerations. Additional protection components can also be included in the wind turbine system 100.

The power converter 130 can receive control signals from, for instance, the control system 142 via the controller 140. In some implementations, control system 142 can be a farm level control system configured to provide control signals to a plurality of wind turbine systems in a wind turbine farm. For instance, the control signals can be determined based on a detected grid event, such as a high voltage event or a low voltage event.

Typically, the control signals provide for control of the operation of the power converter 130. For example, feedback in the form of sensed speed of the DFIG 120 can be used to control the conversion of the output power from the rotor bus 124 to maintain a proper and balanced multi-phase (e.g. three-phase) power supply. Other feedback from other sensors can also be used by the controller 140 to control the power converter 130, including, for example, stator and rotor bus voltages and current feedbacks. Using the various forms of feedback information, switching control signals (e.g. gate timing commands for IGBTs), stator synchronizing control signals, and circuit breaker signals can be generated.

Figure 3:
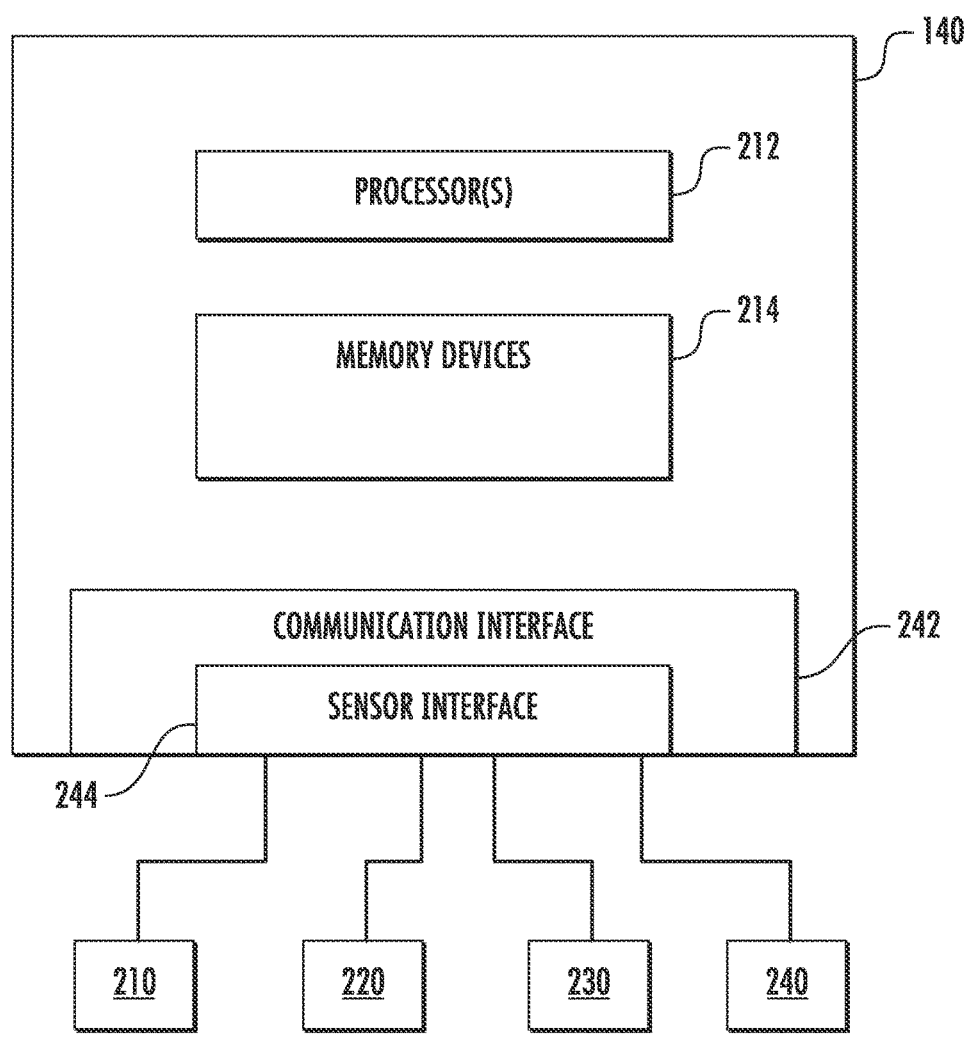
FIG. 3 depicts an overview of an example control device according to example embodiments of the present disclosure.

Referring now to FIG. 3, there is illustrated a block diagram of one embodiment of suitable components that may be included within controller 140 (and/or controller 26) in accordance with example aspects of the present disclosure. As shown, the controller 140 may include one or more processor(s) 212 and associated memory device(s) 214 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 214 may generally be configured to store suitable computer-readable instructions that, when implemented by the processor(s) 212, configure the controller 140 to perform various functions including, but not limited to, determining one or more grid events, controlling a reactive power output and/or operation of an auxiliary circuit breaker based at least in part on the determined grid events, and/or various other suitable computer-implemented functions.

Additionally, the controller 140 may also include a communications interface 242 to facilitate communications between the controller 140 and the various components of the wind turbine 100. An interface can include one or more circuits, terminals, pins, contacts, conductors, or other components for sending and receiving control signals. For instance, the communications interface 242 may serve as an interface to permit the controller 140 to receive one or more signals indicative of a grid current and/or a grid voltage. Moreover, the controller 140 may include a sensor interface 244 (e.g., one or more analog-to-digital converters) to permit signals transmitted from the sensors (e.g. sensors 210, 220, 230, 240) to be converted into signals that can be understood and processed by the processors 212.

Figure 4:
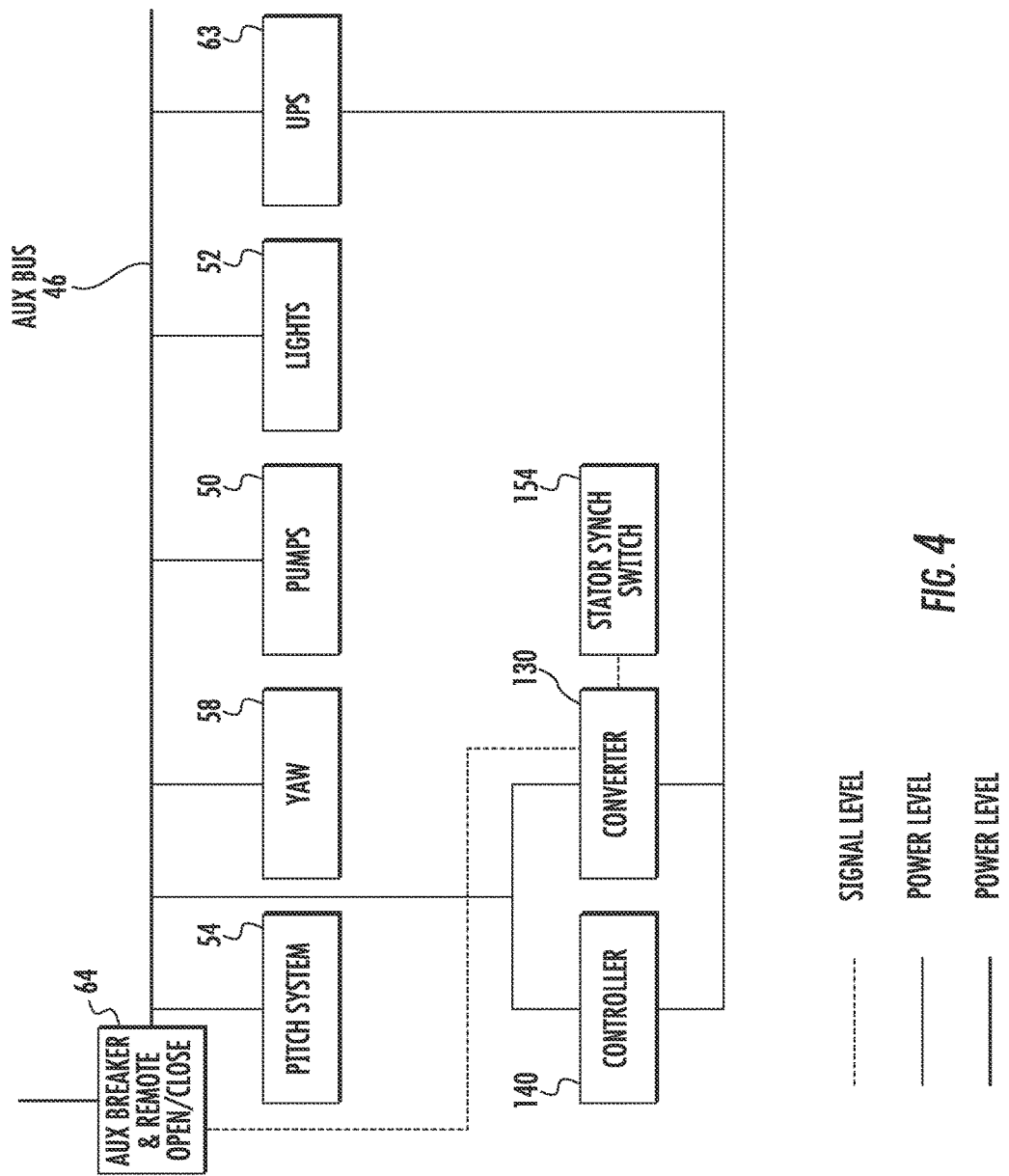
FIG. 4 depicts an example auxiliary system of a wind turbine system according to example embodiments of the present disclosure.

FIG. 4 depicts an overview of example auxiliary system 170 associated with a wind turbine system 100 according to example embodiments of the present disclosure. Auxiliary system 170 may be used in combination with one or more of the above disclosed embodiments or as a separate embodiment. As shown, auxiliary system 170 includes a plurality of auxiliary wind turbine loads, such as yaw drive 58, pumps 50, lights 52, and pitch system 54.

In a particular implementation, power having substantially constant frequency and voltage is provided to a common auxiliary bus 46. At least one of the auxiliary wind turbine loads can be coupled to the common auxiliary bus 46. For instance, as depicted in FIG. 4, yaw drive 58, pumps 50, lights 52, and pitch system 54 are coupled directly to the common auxiliary bus 46. In particular, pitch system 54 can be configured to drive one or more pitch adjustment motors.

FIG. 4 further depicts an auxiliary circuit breaker 64. Auxiliary circuit breaker 64 can be configured to connect or disconnect auxiliary bus 46 from system 100 (and thereby from the grid). In particular, auxiliary circuit breaker 64 can be configured to trip (thereby disconnecting auxiliary bus 46) when an amount of current flowing between the main terminals of auxiliary circuit breaker 64 reaches a threshold. Auxiliary circuit breaker 64 can further have an associated shunt trip device. For instance, the shunt trip device can be further coupled to a controller, such as controller 140. In this manner, the shunt trip device and/or auxiliary circuit breaker 64 can receive one or more control signals from controller 140, and can control operation of auxiliary circuit breaker 64 based at least in part on the one or more control signals. For instance, as described above, controller 140 can be configured to detect or otherwise determine one or more grid events, and to provide a control signal to auxiliary circuit breaker 64 via the shunt trip device causing auxiliary circuit breaker 64 to trip. In this manner, the control signal can cause auxiliary circuit breaker 64 to trip independently from the current flowing through the main terminals of auxiliary circuit breaker 64. As indicated above, in some implementations, the converter 140 and/or stator sync switch 154 can also be disconnected from the grid based at least in part on the one or more grid events.

FIG. 4 further depicts an uninterruptable power supply (UPS) 63. UPS 63 can be coupled between the auxiliary bus 46 and power converter 130 (and controller 140) to provide power following the de-energization of auxiliary bus 146. In this manner, upon detection of the one or more grid events, converter controller 140 can send a control signal to the auxiliary circuit breaker 64 via converter 130, such that it can be opened remotely (e.g. without user intervention). For instance, remote opening of the auxiliary circuit breaker 64 can be implemented using a motor operator and/or a solenoid associated with the auxiliary circuit breaker 64. In such implementations, when the grid event has ceased, a control signal may be sent to the auxiliary circuit breaker 64 via converter 130 causing the auxiliary circuit breaker 64 to close.

Figure 5:
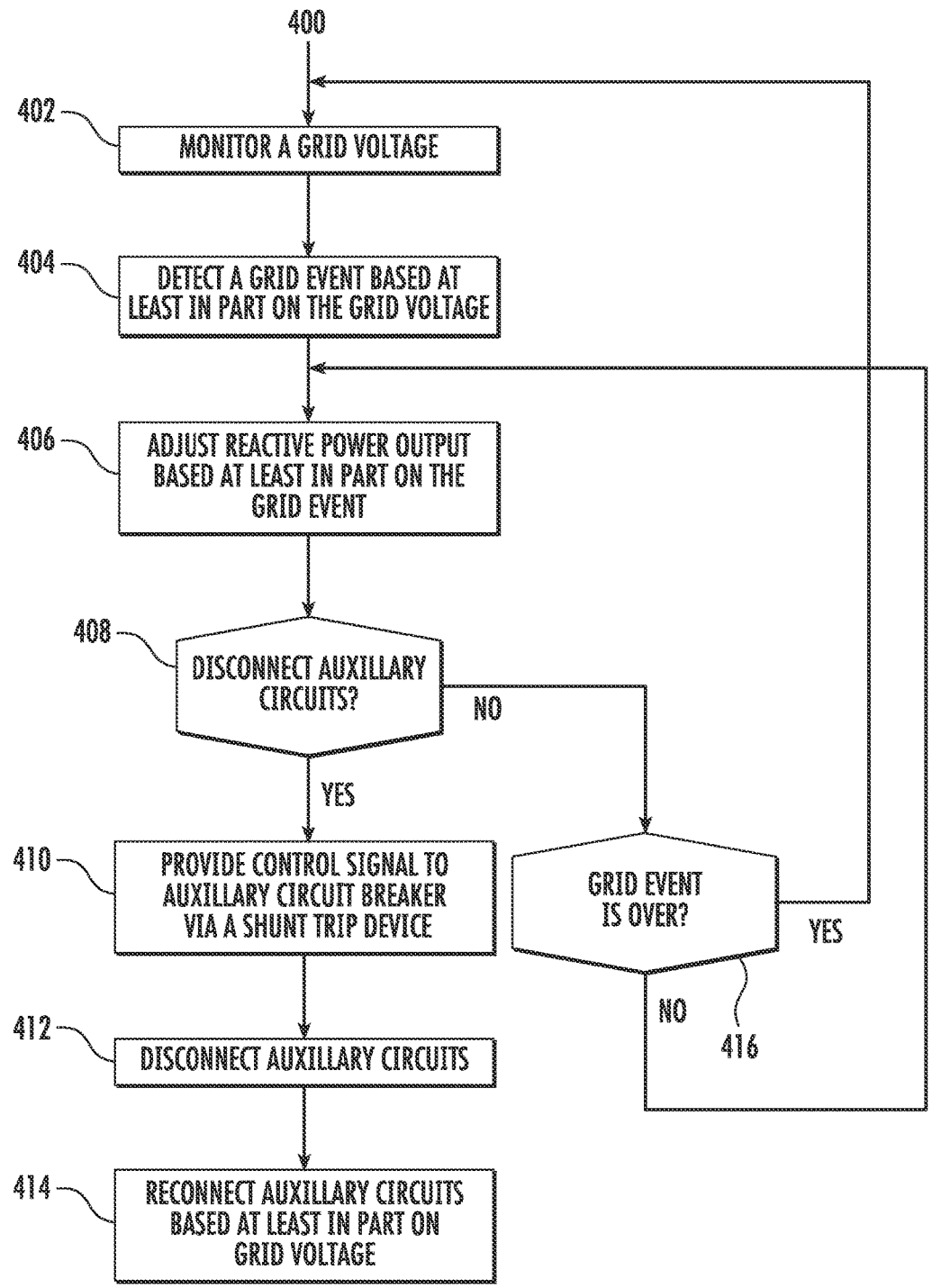
FIG. 5 depicts a flow diagram of an example method of controlling operation of one or more auxiliary loads according to example embodiments of the present disclosure.

FIG. 5 depicts a flow diagram of an example method 400 of controlling operation of an auxiliary circuit breaker based on a grid event according to example embodiments of the present disclosure. Method (400) can be implemented by one or more computing devices, such as one or more of the computing devices depicted in FIG. 3. In addition, FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include monitoring a grid voltage. In particular, the grid voltage can be monitored by a power converter system associated with a wind turbine system or other power system. Alternatively or in addition, a grid current can be monitored by the power converter system. In various implementations, the grid voltage and/or current may be monitored continuously or periodically.

At (404), method (400) can include detecting a grid event based at least in part on the monitored grid voltage and/or grid current. For instance, a grid event may be detected by determining a grid impedance based at least in part on the grid voltage and/or grid current. A grid event can correspond to a high voltage event, low voltage event, zero voltage event, frequency shift, phase shift, an islanding event, and/or various other events.

At (406), method (400) can include adjusting a reactive power output of the wind turbine system. For instance, the reactive power output can be adjusted based at least in part on the grid event. In particular, the reactive power output can be increased or decreased to compensate for the grid conditions caused by the grid event.

At (408), method (400) can include determining whether to disconnect the power path associated with the wind turbine system. As indicated above, the wind turbine system may include one or more main circuits (e.g. power converter) directly in the power production path of the wind turbine system, and one or more auxiliary circuits that are not directly in the power production path of the wind turbine system. For instance, the auxiliary circuits may include circuits for providing power to one or more auxiliary components, such as lights, pumps, fans, diagnostic equipment, yaw drives, pitch adjustment motors, and/or various other components. Such main and/or auxiliary circuits may be damaged by various grid events if protective action is not taken. In this manner, the wind turbine system may be configured to disconnect the power path based at least in part on the detected grid event. For instance, the power path may be disconnected if the grid voltage associated with the grid event differs from a threshold voltage (or voltage range), and/or based on various other factors associated with the detected grid event. As another example, the power path may not be disconnected if the reactive power adjustment can sufficiently compensate for the grid conditions.

When it is determined that the power path is to be disconnected, method (400) can include providing a control signal to an auxiliary circuit breaker (410). For instance, the power converter system can provide the control signal to the auxiliary circuit breaker via a shunt trip device associated with the auxiliary circuit breaker.

At (412), method (400) can include disconnecting the auxiliary circuits from the wind turbine system (and thereby from the grid) based at least in part on the control signal. For instance, upon receiving the control signal from the power converter system and/or the shunt trip device, the auxiliary circuit breaker can trip (e.g. open a circuit), thereby disconnecting an auxiliary bus. As indicated above, one or more of the auxiliary components may be coupled to the auxiliary bus. In example embodiments, the power converter system can also be disconnected from the grid subsequent to providing the control signal to the auxiliary circuit breaker.

As indicated above, one or more additional circuit breakers associated with the one or more main circuits of the wind turbine system can also be tripped in response to detecting a grid event. For instance, one or more of grid breaker 158, stator bus breaker 156, line bus breaker 152, or other circuit breaker may be tripped in response to the grid event. In this manner, a control signal may be sent to the one or more additional circuit breakers, causing the breakers to trip.

At (414), method (400) can include reconnecting the auxiliary circuits to the system. For instance, the grid voltage and/or grid current can continue to be monitored while the auxiliary circuits are disconnected. In this manner, when the grid conditions are such that operation of the auxiliary components would not cause damage to the auxiliary components, the auxiliary circuits can be reconnected to the system. The auxiliary circuits may be reconnected by resetting the auxiliary circuit breaker. In example embodiments, the auxiliary circuit breaker may be reset automatically based at least in part on the monitored grid voltage and/or grid current, or the auxiliary circuit breaker can be reset manually, for instance, by a field technician or other user.

Referring back to (406) of method (400), when it is determined that the power path is not to be disconnected, at (416), method (400) can include determining whether the grid event has ceased. If the grid event has ceased, method (400) can include returning to (402). If the grid event has not ceased, method (400) can include returning to (406).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control method of controlling operation of one or more auxiliary circuits in a wind turbine system, the method comprising:
   detecting a grid event associated with a wind turbine system;
   in response to detecting the grid event, providing a control signal to an auxiliary circuit breaker, wherein the auxiliary circuit breaker is not directly in a power production path of the wind turbine system and the auxiliary circuit breaker being associated with one or more auxiliary circuits that are not directly in a power production path of the wind turbine system;
   disconnecting, by the auxiliary circuit breaker, the one or more auxiliary circuits from the grid based at least in part on the control signal, said control signal causing the disconnection of the one or more auxiliary circuits independently from an amount of load current flowing between the auxiliary circuit breaker main contacts.

2. The control method of claim 1, wherein the control signal is provided to the auxiliary circuit breaker via a shunt trip device coupled to the auxiliary circuit breaker.

3. The control method of claim 1, wherein the grid event corresponds to a high voltage event, a low voltage event, a zero voltage event, a frequency shift, a phase shift, or an islanding event.

4. The control method of claim 1, further comprising providing a reconnect signal to the auxiliary circuit breaker when grid conditions are in accordance with safe operation of the one or more auxiliary circuits.

5. The control method of claim 1, wherein the one or more auxiliary circuits are associated with at least one of lighting systems, pump systems, fan systems, or control systems associated with the wind turbine system.

6. The control method of claim 1, wherein detecting a grid event associated with a wind turbine system comprises:
   monitoring, by a power converter, a voltage associated with the grid;
   comparing the voltage associated with the grid to a voltage threshold; and
   detecting a grid event based at least in part on the comparison of the voltage associated with the grid to the voltage threshold.

7. The control method of claim 6, further comprising adjusting, by the power converter associated with the wind turbine system, an amount of reactive power generated by the wind turbine system based at least in part on the comparison of the voltage associated with the grid to the voltage threshold.

8. The control method of claim 6, further comprising disconnecting the power converter from the grid based at least in part on the comparison of the voltage associated with the grid to the voltage threshold.

9. The control method of claim 8, wherein disconnecting the power converter from the grid comprises, subsequent to providing the control signal to the auxiliary circuit breaker, disconnecting the power converter from the grid.

10. The control method of claim 1, wherein detecting a grid event associated with a wind turbine system comprises:
    determining an impedance of the grid based at least in part on a monitored grid voltage or grid current.

11. A control system associated with a wind turbine system, the control system configured to control operation of an auxiliary system associated with the wind turbine system by:
    detecting a grid event associated with an electrical grid associated with the wind turbine system; and
    in response to detecting the grid event, providing a control signal to an auxiliary circuit breaker associated with the auxiliary system, wherein the auxiliary circuit breaker is not directly in a power production path of the wind turbine system, the auxiliary circuit breaker being configured to selectively couple the auxiliary system to the wind turbine system, the control signal causing the auxiliary circuit breaker to disconnect the auxiliary system from the wind turbine system independently from an amount of load current flowing between the auxiliary circuit breaker main contacts.

12. The control system of claim 11, wherein the control signal is provided to the auxiliary circuit breaker via a shunt trip device coupled to the auxiliary circuit breaker.

13. The control system of claim 11, wherein the grid event corresponds to a high voltage event, a low voltage event, a zero voltage event, a frequency shift, a phase shift, or an islanding event.

14. The control system of claim 11, wherein detecting a grid event associated with the electrical grid comprises:
monitoring a grid voltage associated with the electrical grid;
comparing the grid voltage associated with the electrical grid to a voltage threshold; and
detecting a grid event based at least in part on the comparison of the voltage associated with the grid to the voltage threshold.

15. The control system of claim 14, wherein the control system is further configured to determine an adjusted reactive power output of the wind turbine system based at least in part on the comparison of the voltage associated with the grid to the voltage threshold.

16. A wind turbine system comprising:
a rotor;
a stator;
one or more auxiliary loads for supporting operation of the wind turbine system;
a power converter system configured to monitor a voltage associated with an electrical grid; and
a control device configured to control operation of an auxiliary circuit breaker configured to selectively couple the one or more auxiliary loads to the wind turbine system by:
detecting a grid event associated with the electrical grid; and
in response to detecting the grid event, providing a control signal to the auxiliary circuit breaker, the control signal being provided via a shunt trip device coupled to the auxiliary circuit breaker, the control signal causing the auxiliary circuit breaker to disconnect the one or more auxiliary loads.

17. The wind turbine system of claim 16, wherein the control signal causes the auxiliary circuit breaker to disconnect the one or more auxiliary loads independently from an amount of load current flowing between the auxiliary circuit breaker main contacts.

18. The wind turbine system of claim 16, wherein the control device is further configured to, in response to detecting the grid event, provide a control signal to one or more additional circuit breakers associated with the wind turbine system, the control signal causing the one or more additional circuit breakers to trip.

19. The wind turbine system of claim 16, wherein the control device is further configured to control operation of the auxiliary circuit breaker by providing a reconnect signal to the auxiliary circuit breaker when grid conditions are in accordance with safe operation of the one or more auxiliary loads.

20. The wind turbine system of claim 16, wherein detecting a grid event associated with the electrical grid comprises:
comparing the voltage associated with the grid to a voltage threshold;
and
detecting a grid event based at least in part on the comparison of the voltage associated with the grid to the voltage threshold.

* * * * *